(12) United States Patent
Chou et al.

(10) Patent No.: US 7,852,719 B2
(45) Date of Patent: Dec. 14, 2010

(54) SYSTEM AND METHOD FOR GENERATING OUTPUT SIGNALS INDICATING SPECIFIC AREAS ON AN OPTICAL DISC UTILIZING A PROTECTION MEANS (75) Inventors: Shu-Hung Chou, Taipei County (TW); Meng-Hsueh Lin, Taipei County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 12/832,052

(22) Filed: Jul. 7, 2010

(65) Prior Publication Data
US 2010/0271915 A1 Oct. 28, 2010

Related U.S. Application Data (62) Division of application No. 11/307,419, filed on Feb. 6, 2006, now Pat. No. 7,778,125.

(51) Int. Cl.
*G11B 7/00* (2006.01)
(52) U.S. Cl. ............... 369/47.22; 369/47.27; 369/47.31
(58) Field of Classification Search ............ 369/47.22, 369/47.27
See application file for complete search history.

(56) References Cited

U.S. PATENT DOCUMENTS

| 4,618,898 | A | 10/1986 | Young |
| 4,663,751 | A | 5/1987 | Kaku |
| 4,695,993 | A | 9/1987 | Takagi |
| 5,297,115 | A | 3/1994 | Poon |
| 5,477,512 | A | 12/1995 | Kubo |
| 5,544,135 | A | 8/1996 | Akin |
| 5,602,812 | A | 2/1997 | Miura |
| 5,684,769 | A | 11/1997 | Kaneko |
| 5,694,382 | A | 12/1997 | Oliver |
| 6,459,667 | B1 | 10/2002 | Iijima |
| 6,643,242 | B1 | 11/2003 | Huang |
| 6,690,630 | B1 | 2/2004 | Hu |
| 7,159,083 | B2 | 1/2007 | Samuel |
| 7,245,572 | B2 | 7/2007 | Lin |
| 2005/0002298 | A1* | 1/2005 | Hou ................... 369/47.22 |
| 2007/0217308 | A1* | 9/2007 | Chen et al. ........... 369/53.21 |

FOREIGN PATENT DOCUMENTS

TW    I260011    8/2006

* cited by examiner

*Primary Examiner*—Lixi Chow
(74) *Attorney, Agent, or Firm*—Winston Hsu; Scott Margo (57) ABSTRACT A system for generating an output signal indicating a specific area on an optical disc is disclosed. The system includes: a detecting circuit, a header signal generator, a protection circuit, a counter and an output signal generator. The detecting circuit detects pre-recorded address information on the optical disc to generate a detection signal. The header signal generator detects headers on the optical disc to generate a header signal. The protection circuit computes a first counter value and reloads the first counter value according to the detection signal and the header signal, wherein the protection circuit does not reload the first counter value twice successively due to the header signal. The counter computes a second counter value and reloads the second counter value according to the first counter value. The output signal generator generates the output signal according to the first counter value.

12 Claims, 10 Drawing Sheets

| Header | | Recording field | | | | | | |
|---|---|---|---|---|---|---|---|---|
| Header | Mirror | Gap | Guard 1 | VFO 3 | PS | Data | PA 3 | Guard 2 | Buffer |
| 128 | 2 | 10+I/16 | 20+k | 35 | 3 | 24/8 | 1 | 55-k | 25-J/16 |

SYSTEM AND METHOD FOR GENERATING OUTPUT SIGNALS INDICATING SPECIFIC AREAS ON AN OPTICAL DISC UTILIZING A PROTECTION MEANS

CROSS REFERENCE TO RELATED APPLICATIONS

This application is a division of U.S. application Ser. No. 11/307,419 filed Feb. 6, 2006.

BACKGROUND

The present invention relates to a system and method for generating an output signal indicating a specific area on an optical disc, and more particularly, to a system and method for generating an output signal indicating a specific area on an optical disc utilizing a protection means.

Figure 1:
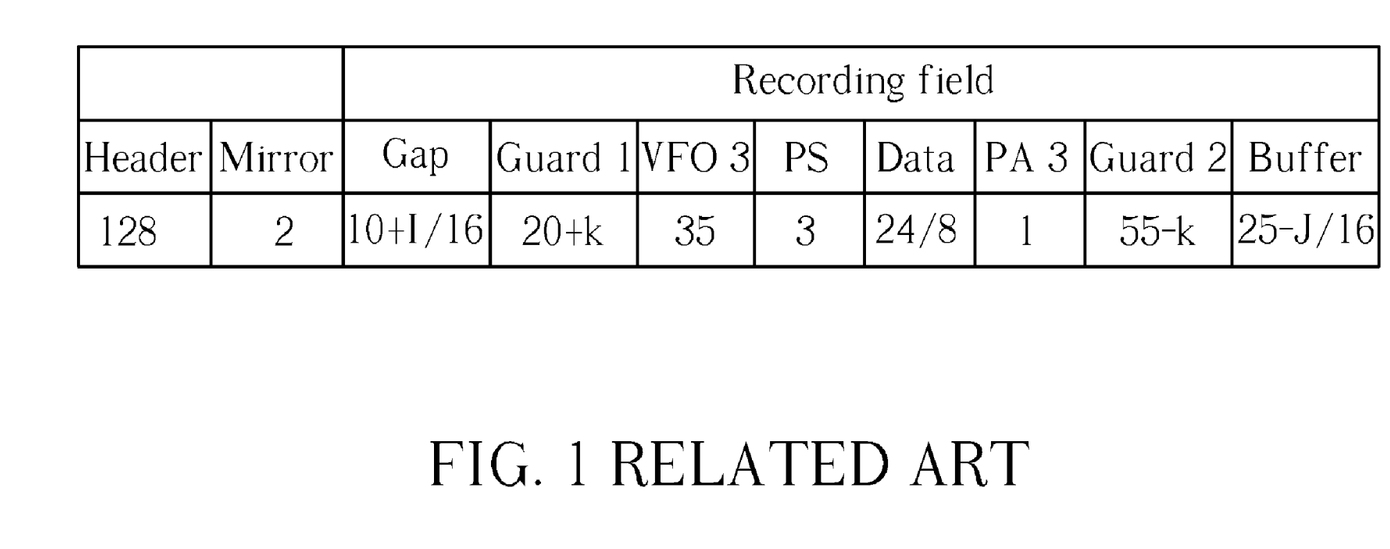
FIG. 1 is a diagram of a related art DVD-RAM data field.

An optical disc with pre-recorded address information (ex. DVD-RAM disc) always includes different kinds of areas, as shown in FIG. 1, and which area is to be processed should be determined accurately while reading data from the target area or recording data onto the target area. Since the data field configuration is clearly defined in the DVD-RAM specification, further description is omitted here for brevity. As known to those skilled in this art, many operations should be performed before processing the target area, such as slicer reset, PLL adjusting, etc. If the target area to be processed can be determined as early as possible, the aforementioned operations can be performed accurately, thereby increasing the accuracy of data reading or data recording.

Traditionally, two steps are necessary for generating desired output signals indicating specific areas of an optical disc with pre-recorded address information, which includes: utilizing a header signal generated from optical pick-up head signals and utilizing pre-recorded address information, which is called Physic identification (PID) for a DVD-RAM disc. As the pre-recorded address information cannot be obtained initially, the header signal is first utilized to generate output signals indicating specific areas of an optical disc, and then pre-recorded address information is utilized.

Optical pick-up head signals are usually unstable, however, and the associated header signals may include errors. This means the generation of pre-recorded address information may be affected due to the errors, and the output signals indicating specific areas of the optical disc according to the header signals and pre-recorded address information become unreliable.

Accordingly, many related art methods or systems are disclosed to solve the above-mentioned problems. For example, U.S. Pat. No. 6,459,667 discloses an optical disc recording and reproducing method for recording and reproducing data in and from an optical disc by the use of the optical disc as a recording medium. The related art method disclosed in this patent includes: analog processing and binarizing a first signal read from an optical disc; and controlling, recording and reproducing a second signal in and from the optical disc in analog processing; and switching between at least two modes for generating a gate signal. The generated gate signal is for instructing the analog processing step to perform switching of the gain to be used therein, where the switching depends upon the first signal read from the optical disc.

SUMMARY

It is therefore one of the many objectives of the claimed disclosure to provide a system and method for generating an output signal indicating a specific area on an optical disc using a protection means.

Another objective of the claimed disclosure is to provide a system and method for generating an output signal indicating a specific area on an optical disc without switching between two modes, to avoid the disadvantages of the related art method.

According to the claimed disclosure, a system for generating an output signal indicating a specific area on an optical disc is disclosed. The system includes: a detecting circuit, a header signal generator, a protection circuit, a counter and an output signal generator. The detecting circuit is used for detecting pre-recorded address information on the optical disc to generate a detection signal, and the header signal generator is used for detecting headers on the optical disc to generate a header signal. The protection circuit, which is coupled to the detecting circuit and the header signal generator, is used for computing a first counter value and reloading the first counter value according to the detection signal and the header signal, wherein the protection circuit does not reload the first counter value twice successfully due to the header signal. The counter, coupled to the protection circuit, is used for computing a second counter value and reloading the second counter value according to the first counter value. The output signal generator, which is coupled to the counter, is used for generating the output signal according to the first counter value.

A method for generating an output signal indicating a specific area on an optical disc is also disclosed. The method includes: (a) detecting pre-recorded address information on the optical disc to generate a detection signal; (b) detecting headers on the optical disc to generate a header signal; (c) computing a first counter value; (d) reloading the first counter value according to the detection signal and the header signal, wherein the first counter value is not successively reloaded twice due to the header signal; (e) computing a second counter value; (f) reloading the second counter value according to the first counter value; and (g) generating the output signal according to the first counter value.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
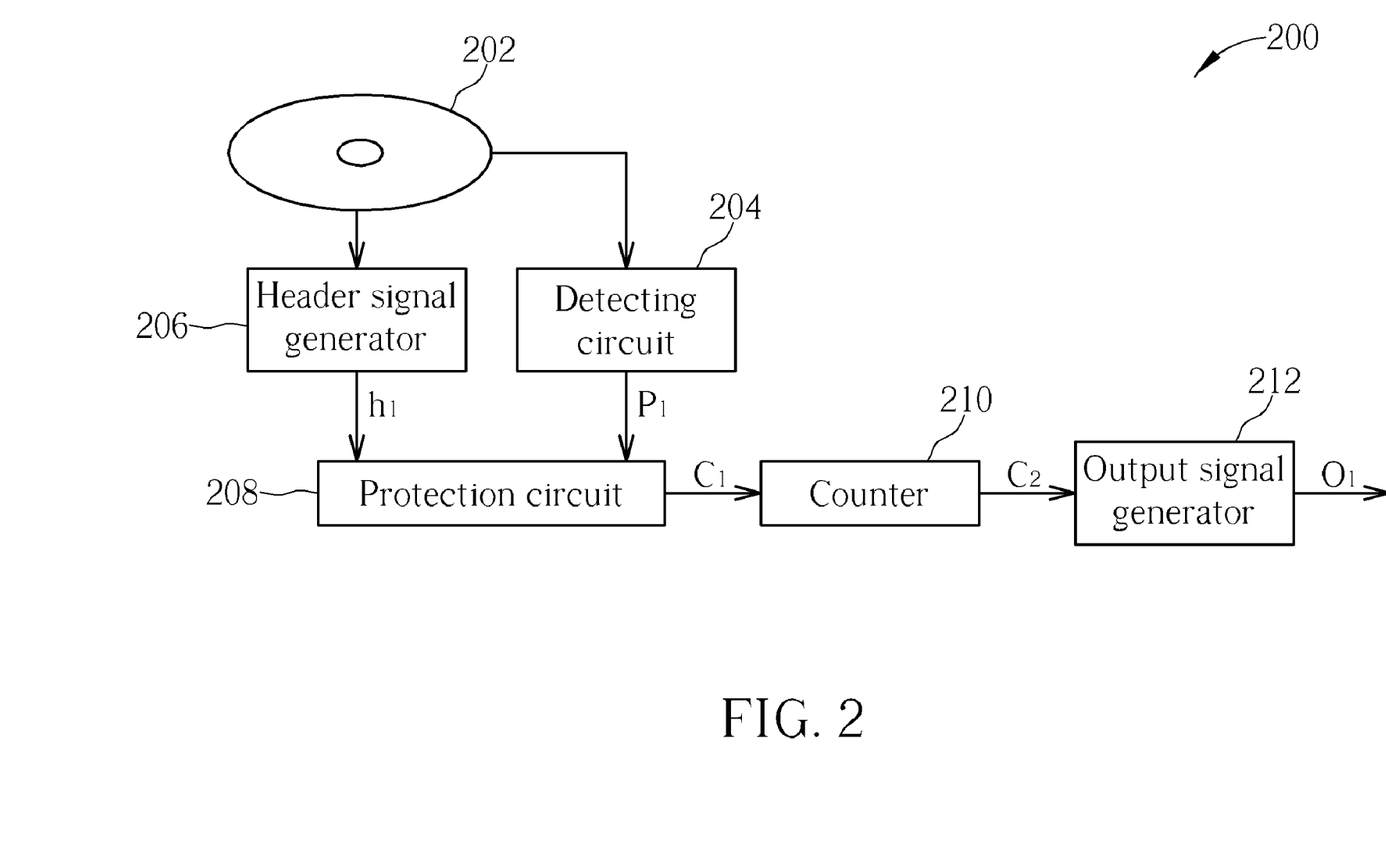
FIG. 2 is a block diagram of a system for generating an output signal indicating a specific area on an optical disc according to a first embodiment of the present invention.

FIG. 2 is a block diagram of a system 200 for generating an output signal O1 indicating a specific area on an optical disc 202 according to a first embodiment of the present invention. As shown in FIG. 2, the system 200 includes an optical disc 202, a detecting circuit 204, a header signal generator 206, a protection circuit 208, a counter 210, and an output signal generator 212. The detecting circuit 204 is used for detecting pre-recorded address information on the optical disc 202 to generate a detection signal P1, and the header signal generator 206 is used for detecting headers on the optical disc 202 to generate a header signal h1. The protection circuit 208, coupled to the detecting circuit 204 and header signal generator 206, is used for computing a first counter value C1 and reloading the first counter value C1 according to the detection signal P1 and header signal h1. The output signal generator 212, coupled to the counter 210, is used for generating an output signal O1 indicating a specific area on the optical disc 202 according to the first counter value C1.

Figure 3:
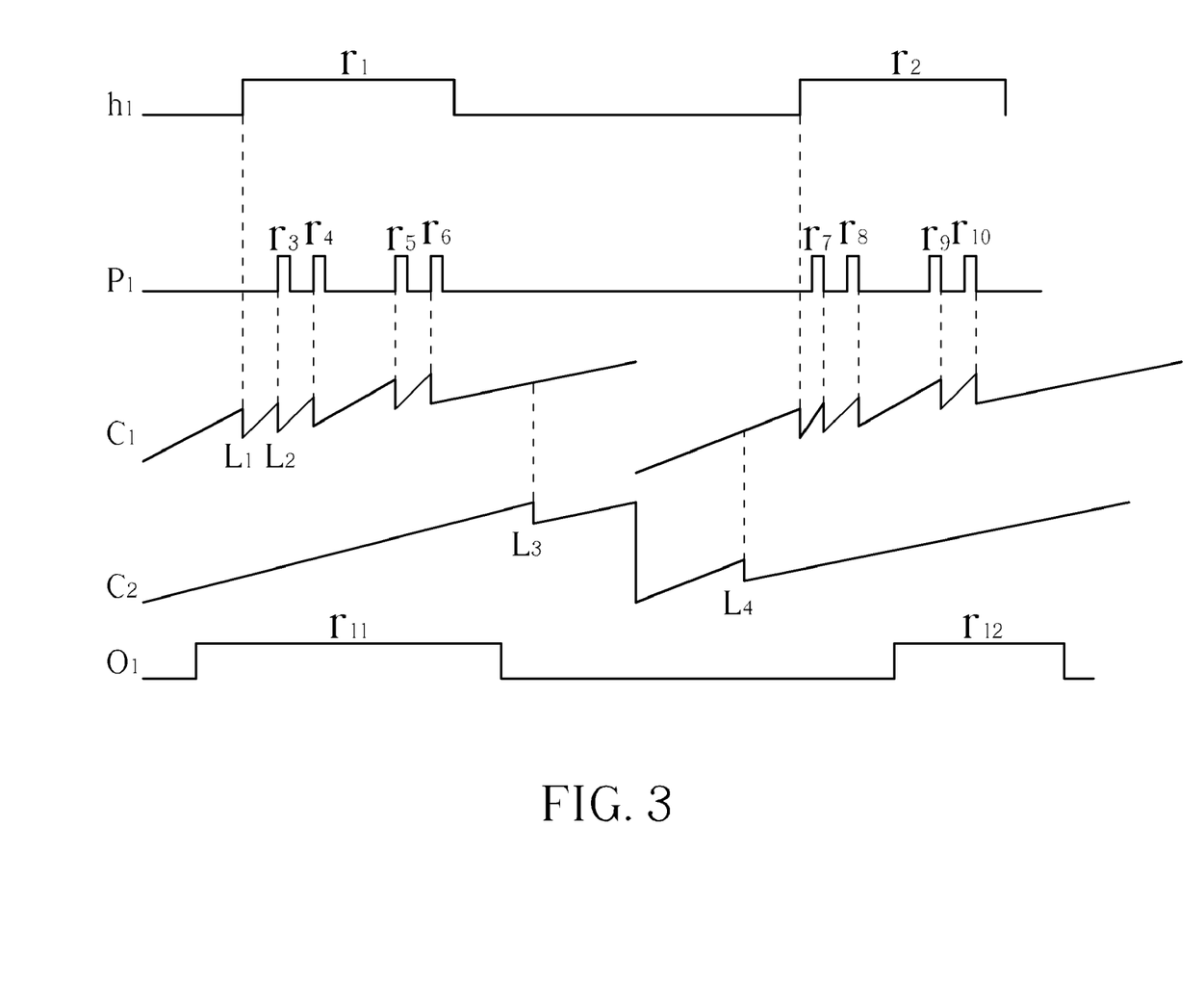
FIG. 3 is a schematic diagram illustrating the operation of the system shown in FIG. 2.

FIG. 3 is a schematic diagram illustrating the operation of the system 200 shown in FIG. 2. Please refer to FIG. 2 and FIG. 3 together to further illustrate the first embodiment of the present invention. It should be noted that FIG. 3 and the description thereof merely illustrate how to generate output signals according to the detecting signal and the header signal, and are not meant to be taken as limitations of the present disclosure.

As shown in FIG. 3, the header signal h1 includes a plurality of regions r1, and r2 indicating specific headers, and the detecting signal P1 includes a plurality of regions r3-r10 indicating specific pre-recorded address information. The protection circuit 208 reloads the first counter value C1 (that is, it updates the first counter value C1 by a predetermined value) according to regions r1-r10, as indicated by the reloading timing L1, L2 shown in FIG. 3. It should be noted that in FIG. 3 other reloading timings of the first counter value C1 are not illustrated for simplicity. The counter 210 reloads the second counter value C2 when the first counter value C1 reaches a predetermined value, as indicated by the reloading timing L3, L4 shown in FIG. 3. Also, the output signal generator 212 generates the output signal O1 when the second counter value C2 reaches a predetermined value.

In this case, the output signal generator 212 informs a plurality of regions, such as r11, and r12 (the regions indicating the specific areas of the optical disc 202 using the output signal O1) when the second counter value C2 reaches a predetermined value. In addition, in order to stabilize the output signal O1, the counter 210 does not reload the second counter value C2 during timing of the regions r11 and r12.

It should be noted that in this embodiment the protection circuit 208 does not reload the first counter value C1 twice successively due to the header signal h1; thus the system 200 does not require a switching operation between the header signal h1 and the detecting signal P1. In this way, the system 200 can avoid noise interference resulting from the switching operation. Furthermore, by using the first counter value C1 to reload the second counter value C2, the system 200 can avoid generating erroneous output signals due to noise or a sudden pulse, and the generation of the output signal thereby becomes more accurate and stable.

Figure 4:
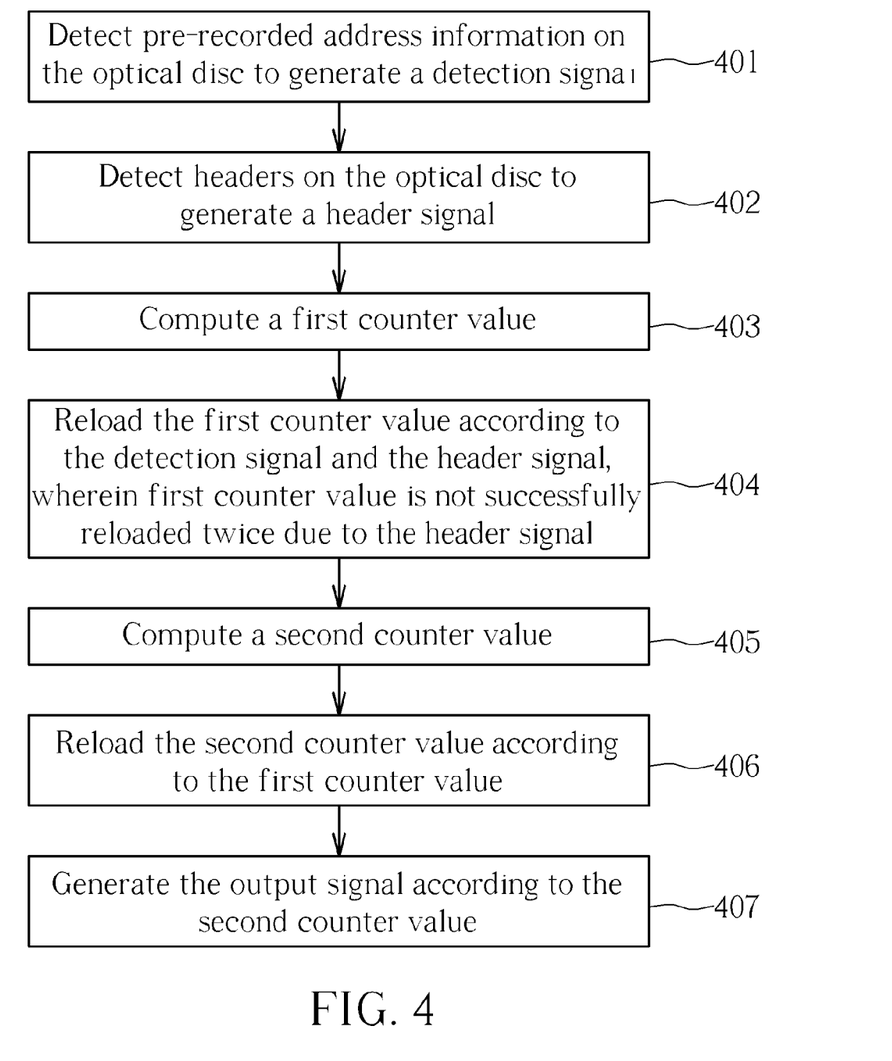
FIG. 4 is a flow chart illustrating the method for generating an output signal indicating a specific area on an optical disc according to the first embodiment of the present invention.

FIG. 4 is a flow chart illustrating the method for generating an output signal indicating a specific area on an optical disc according to the first embodiment of the present invention. The method is performed by the system 200 shown in FIG. 2, and summarized as follows.

Step 401: Detect pre-recorded address information on an optical disc 200 to generate a detection signal P1.

Step 402: Detect headers on the optical disc 200 to generate a header signal h1.

Step 403: Compute a first counter value C1.

Step 404: Reload the first counter value C1 according to the detection signal P1 and header signal h1, wherein the first counter value C1 is not successfully reloaded twice due to the header signal h1.

Step 405: Compute a second counter value C2.

Step 406: Reload the second counter value C2 according to the first counter value C1.

Step 407: Generate an output signal O1 according to the second counter value C2.

It should be noted that the output signal O1 and detecting signal P1 could be named by other terms for different kinds of optical discs. For example, if the optical disc 202 is a DVD-RAM disc, the pre-recorded address information is called physical identification (PID), and the output signal is known as a field signal.

Figure 5:
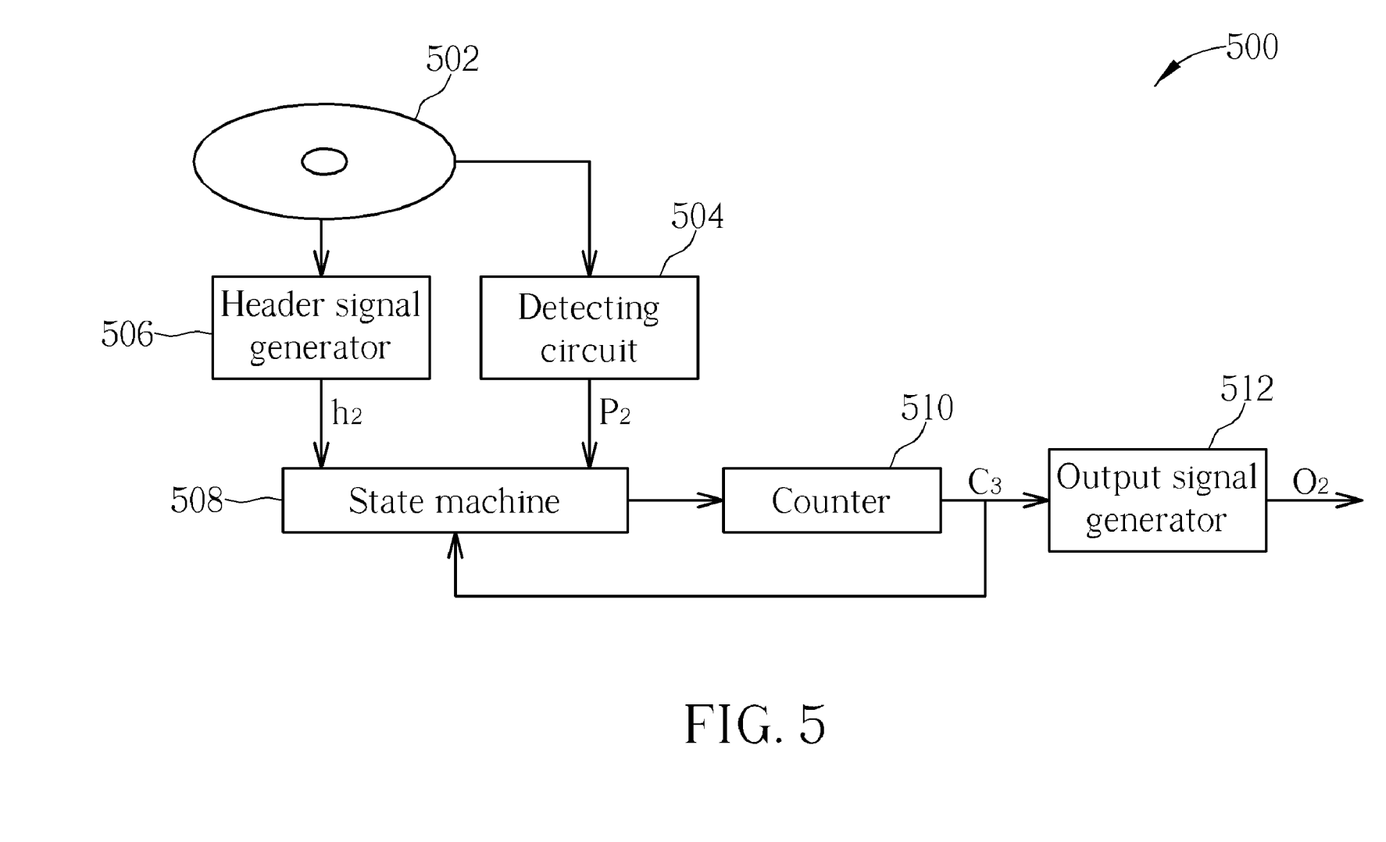
FIG. 5 is a block diagram of a system for generating an output signal indicating a specific area on an optical disc according to a second embodiment of the present invention.

FIG. 5 is a block diagram of a system 500 for generating an output signal O2 indicating a specific area on an optical disc 502 according to a second embodiment of the present invention. Similar to the system 200 illustrated in FIG. 2, the system 500 includes an optical disc 502, a detecting circuit 504, a header signal generator 506, a counter 510, and an output signal generator 512. The difference between system 200 in FIG. 2 and system 500 in FIG. 5 is that the system 500 makes use of the state machine 508 to serve as the desired protection circuit.

In this embodiment, the state machine 508, coupled to the detection circuit 504, the header signal generator 506 and the counter 510, includes a plurality of states, and determines every reloading timing according to the states, a detection signal P2 generated from the detecting circuit 504, and a header signal h2 generated from the header signal generator 506. The counter 510 is used for computing a counter value C3 and reloading the counter value C3 according to the reloading timing determined by the preceding state machine 508. Furthermore, similar to the output signal generator 212 illustrated in FIG. 2, the output signal generator 512, coupled to the counter 510, is used for generating an output signal O2 according to the counter value C3.

One of the preferred examples of the state machine 508 is that the state machine 508 compares the counter value C3 and a reloading value to which the counter value C3 is reloaded, and refers to the current state to determine whether the loading timing is valid. It should be noted that the counter 510 only reloads its counter value C3 at the valid reloading timing.

Figure 6:
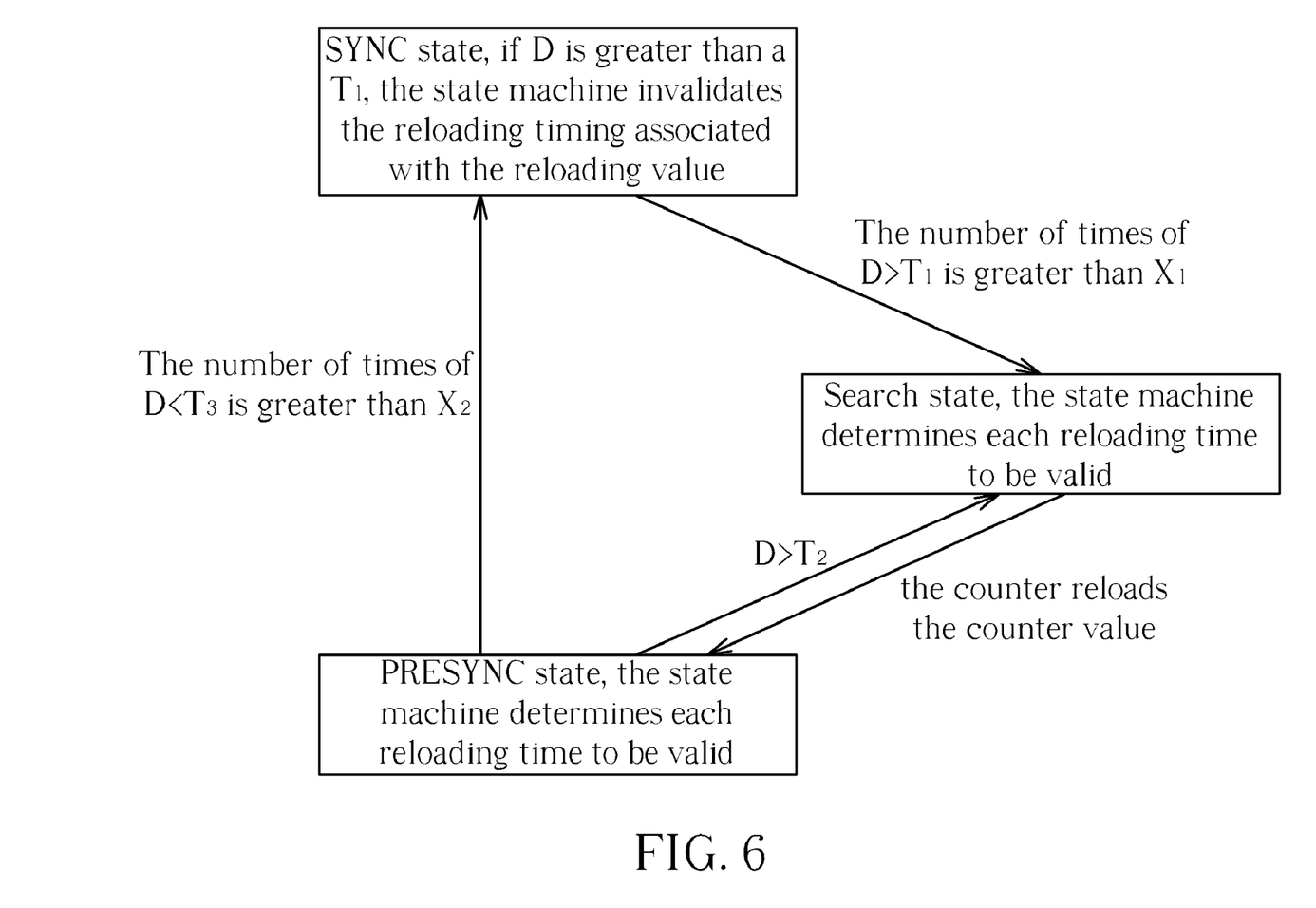
FIG. 6 is a schematic diagram illustrating the operation of a state machine shown in FIG. 5.

FIG. 6 is a schematic diagram illustrating the operation of the state machine 508 shown in FIG. 5. According to the present disclosure, the state machine 508 includes three states: SYNC state, SEARCH state, and PRESYNC state. If the state machine 508 stays at SYNC state, and a difference D between the counter value C3 and the reloading value is greater than a first threshold value T1, the state machine 508 invalidates the reloading timing associated with the reloading value. However, if a number of times that the difference D is greater than the first threshold value T1 is itself greater than a first predetermined value X1, the state machine 508 transits from the SYNC state to the SEARCH state.

In SEARCH state, the state machine 508 determines each reloading time to be valid. When the counter 510 reloads the counter value C3, the state machine 508 transits from the SEARCH state to the PRESYNC state.

In PRESYNC state, the state machine 508 determines each reloading time to be valid; if a difference D between the counter value C3 and the reloading value is greater than a second threshold value T2, the state machine 508 transits from the PRESYNC state to the SEARCH state. If a number of times that the difference D is lower than a third threshold T3 value is itself greater than a second predetermined value X2, the state machine 508 transits from the PRESYNC state to SYNC state.

In other words, if the state machine 508 stays at SYNC state, and a number of times that a difference D between the reload value to which the counter value C3 is reloaded and current counter value C3 is larger than a predetermined value is itself larger than M (where M≧1), then the state machine 508 transmits from SYNC state to SEARCH state. If the state machine 508 stays at SEARCH state, the counter 510 reloads the counter value C3 at each reload timing according to the detecting signal P2 and header signal h2, and the state machine 508 transmits from the SEARCH state to PRESYNC state after the counter 510 reloads its counter value C3. If the state machine 508 stays at PRESYNC state, and a difference D between the reload value to which the counter value C3 is reloaded and the current counter value C3 is larger than a predetermined value, then the state machine 508 transits from PRESYNC state to SEARCH state. Also, if the state machine 508 stays at PRESYNC state, and a number of times that a difference between the reload value to which the counter value C3 is reloaded and current counter value C3 is lower than a predetermined value to is itself larger than N (where N≧1), then the state machine 508 transmits from the PRESYNC state to SYNC state. Please note that the first and second predetermined values X1 and X2 and the first and second threshold values T1 and T2 can be programmed according to design requirements.

As described above, by using the state machine 508, the reloading operation of the counter 510 can be stabilized, thereby avoiding erroneous output signals generated due to noise or a sudden pulse of the header signal h2 or detecting signal P2.

Moreover, in the preferred example of the second embodiment shown in FIG. 5, the header signal h2 includes a plurality of regions indicating specific headers, and the detecting signal P2 includes a plurality of regions indicating specific pre-recorded address information, e.g. the header signal h1 and detecting signal P1 shown in FIG. 2. The state machine 508 determines reloading timing of the counter 510 as valid or not according to the specific regions indicating headers or specific pre-recorded address information and the currently entered state. The counter 510 reloads its counter value C3 only at valid reloading timings, and when the counter value C3 reaches a predetermined value, the output signal generator 512 generates the desired output signal O2.

Also, similar to the first embodiment, the output signal generator 512 determines a plurality of regions indicating the specific areas of the optical disc 502 in the output signal O2 when the second counter value C3 reaches a predetermined value. Similarly, in order to stabilize the output signal O2, the counter 510 does not reload the counter value C3 during timing of the specific regions indicating the specific area of the optical disc 502.

Figure 7:
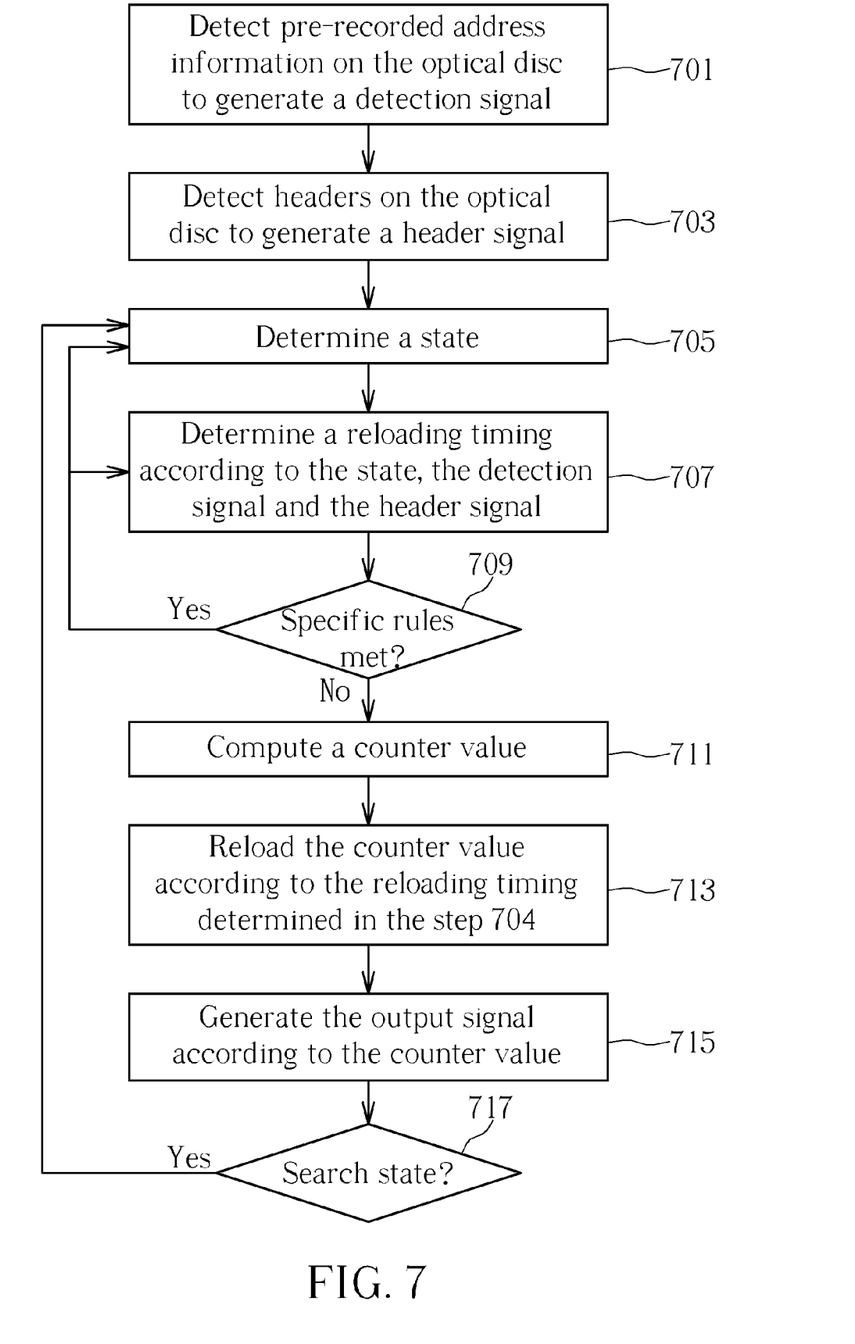
FIG. 7 is a flow chart illustrating the method for generating an output signal indicating a specific area on an optical disc according to the second embodiment of the present invention.

FIG. 7 is a flow chart illustrating the method for generating an output signal indicating a specific area on an optical disc according to the second embodiment of the present invention. The method is performed by the system 500 shown in FIG. 5, and summarized as follows.

Step 701: Detect pre-recorded address information on an optical disc 502 to generate a detection signal P2.

Step 703: Detect headers on the optical disc 502 to generate a header signal h2.

Step 705: Determine a state.

Step 707: Determine a reloading timing according to the state determined in step 705, the detection signal P2 and the header signal h2.

Step 709: Are specific rules met? If yes, go to step 705; otherwise, go to step 711.

Step 711: Compute a counter value C3.

Step 713: Reload the counter value C3 according to the reloading timing determined in step 707.

Step 715: Generate an output signal O3 according to the counter value C3.

Step 717: Is the current state in SEARCH state? If yes, go to 707.

The special rules in step 709 have already been described in FIG. 6. That is, if the state is SYNC state, and a difference D between the counter value C3 and the reloading value is greater than a first threshold value T1, the method proceeds to step 707 where step 707 invalidates the reloading timing associated with the reloading value. However, if a number of times that the difference D is greater than the first threshold value T1 is itself greater than a first predetermined value X1, the method goes back to step 705, where step 705 transits the SYNC state to the SEARCH state.

In SEARCH state, each reloading time is valid. When step 713 reloads the counter value C3, the method goes back to step 705, where step 705 transits from the SEARCH state to the PRESYNC state.

In PRESYNC state, step 707 determines each reloading time to be valid. Also, in this case, the special rule of step 709 is that if a difference D between counter value C3 and the reloading value is greater than a second threshold value T2, the method goes back to step 705 where step 705 transits from the PRESYNC state to the SEARCH state. The special rule further indicates that if a number of times that the difference D is lower than the third threshold T3 value is itself greater than a second predetermined value X2, the method goes back to 705 where step 705 transits from the PRESYNC state to the SYNC state.

Figure 8:
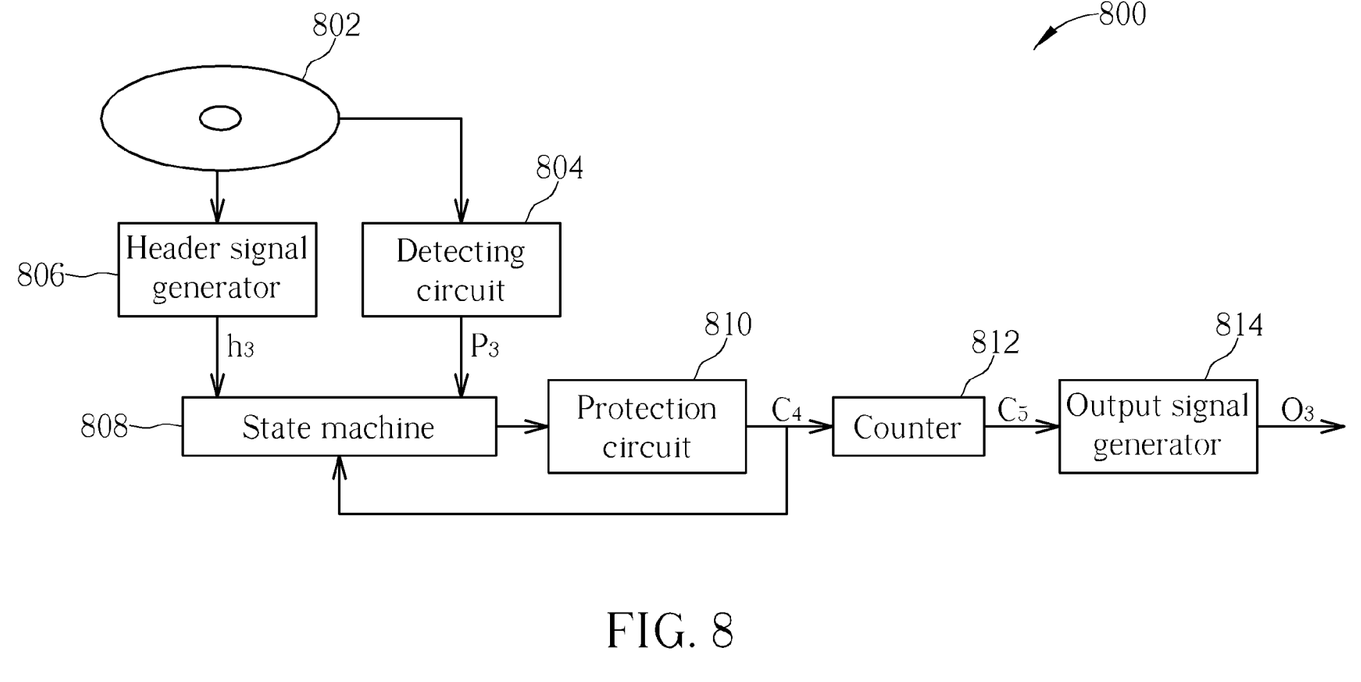
FIG. 8 is a block diagram of a system for generating an output signal indicating a specific area on an optical disc according to a third embodiment of the present invention.

FIG. 8 is a block diagram of a system 800 for generating an output signal O3 indicating a specific area on an optical disc 802 according to a third embodiment of the present invention. Similar to the system 500 shown in FIG. 5, the system 800 shown in FIG. 8 includes an optical disc 802, a detecting circuit 804, a header signal generator 806, a state machine 808, a counter 812, and an output signal generator 814. The difference between the system 500 shown in FIG. 5 and the system 800 shown in FIG. 8 is that the system 800 further includes a protection circuit 810.

In this embodiment, the state machine 808, coupled to the protection circuit 810, header signal generator 806 and detection circuit 804, includes a plurality of states, and determines a reloading timing according to the states, a detection signal P3 generated from the detecting circuit 804 and a header signal h3 generated from the header signal generator 806. The protection circuit 810 is used for computing a first counter value C4 and reloading the first counter value C4 according to the reloading timing determined by the state machine 808, and the counter 812 generates a second counter value C5 according to the first counter value C4.

Furthermore, similar to the output signal generator 512 illustrated in FIG. 5, the output signal generator 814, coupled to the counter 812, is used for generating an output signal O3 according to the second counter value C5.

One of the preferred examples of the state machine 808 is that the state machine 808 compares the first counter value C4 and a reloading value to which the first counter value C4 is reloaded and refers to the current state to determine whether the loading timing is valid. Furthermore, the protection circuit 810 only reloads the first counter value C4 at the valid reloading timing.

Figure 9:
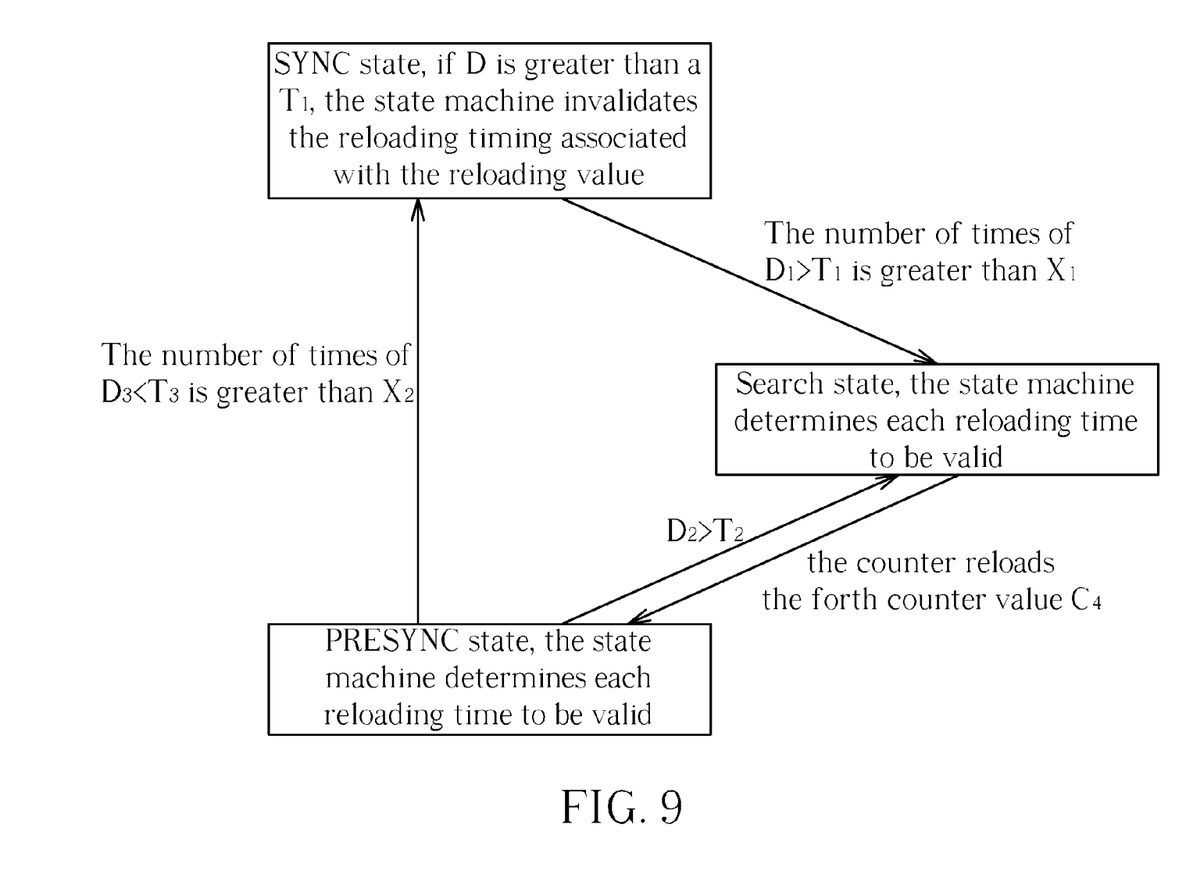
FIG. 9 is a schematic diagram illustrating the operation of a state machine shown in FIG. 8.

FIG. 9 is a schematic diagram illustrating the operation of the state machine shown in FIG. 8. As shown in FIG. 9, the state machine 808 includes three states: SYNC state, SEARCH state, and PRESYNC state.

If the state machine 808 stays at SYNC state, and a difference D between the first counter value C4 and the reloading value is greater than a first threshold value T1, the state machine 808 invalidates the reloading timing associated with the reloading value. Also, if a number of times that the difference D is greater than the first threshold value T1 is itself greater than a first predetermined value X1, the state machine 808 transits from the SYNC state to SEARCH state.

In SEARCH state, the state machine 808 determines each reloading time to be valid, and when the protection circuit 810 reloads the first counter value C4, the state machine 808 transits from the SEARCH state to PRESYNC state.

In PRESYNC state, the state machine 808 determines each reloading timing to be valid and if a difference D between the first counter value C4 and the reloading value is greater than a second threshold value T2, the state machine 808 transits from the PRESYNC state to SEARCH state, and transits from the PRESYNC state to SYNC state if a number of times that the difference D is lower than the third threshold T3 value is itself greater than a second predetermined value X2.

In other words, if the state machine 808 stays at the SYNC state, and a number of times that a difference D between the reload value to which the first counter value C4 is reloaded and current first counter value C4 is larger than a predetermined value is itself larger than M (where M≧1), then the state machine 808 transmits from the SYNC state to SEARCH state. If the state machine 808 stays at the SEARCH state, the protection circuit 810 reloads the first counter value C4 at every reload timing according to the detecting signal P3 and header signal h3, and the state machine 808 transmits from the SEARCH state to PRESYNC mode when the protection circuit 810 reloads the first counter value C4. If the state machine 808 stays at the PRESYNC state, and a difference between the reload value to which the first counter value C4 is reloaded and the current first counter value C4 is larger than a predetermined value, then the state machine 808 transmits from the PRESYNC state to SEARCH mode. Also, if the state machine stays at the PRESYNC state, and a number of times that a difference D between the reload value to which the first counter value C4 is reloaded and the current first counter value C4 is lower than a predetermined value is itself larger than N (where N≧1), then the state machine 808 transmits from the PRESYNC state to the SYNC state.

As described above, by using the state machine 808, the reloading operation of the protection circuit 810 is stabilized, thereby avoiding erroneous reloading operation of the first counter value C4 due to noise, or a sudden pulse of the header signal h3 or detecting signal P3. In this way, since the counter 812 reloads its second counter value C5 according to the protected first counter value C4 and the output signal generator 814 generates the output signal O3 according to the second counter value C5, the generation of the output signal O3 has much better performance.

Moreover, in the third embodiment shown in FIG. 8, the header signal h3 includes a plurality of regions indicating specific headers and the detecting signal P3 includes a plurality of regions indicating specific pre-recorded address information, such as the header signal h1 and detecting signal P1 shown in FIG. 2. The state machine 808 determines the reloading timing of the protection circuit 810 as valid or not according to the specific regions indicating headers/specific pre-recorded address information and the state of the circuit. The protection circuit 810 reloads the first counter value C4 only at valid reloading timing, and when the first counter value C4 reaches a predetermined value, the counter 812 generates the second counter value C5. Additionally, when the second counter value C5 reaches a predetermined value, the output signal generator 814 generates the desired output signal O3.

Also, similar to the second embodiment, the output signal generator 814 determines a plurality of regions indicating the specific areas of the optical disc 802 in the output signal O3 when the second counter value C5 reaches a predetermined value, and the protection circuit 810 does not reload the first counter value C4 during each of the specific regions.

Figure 10:
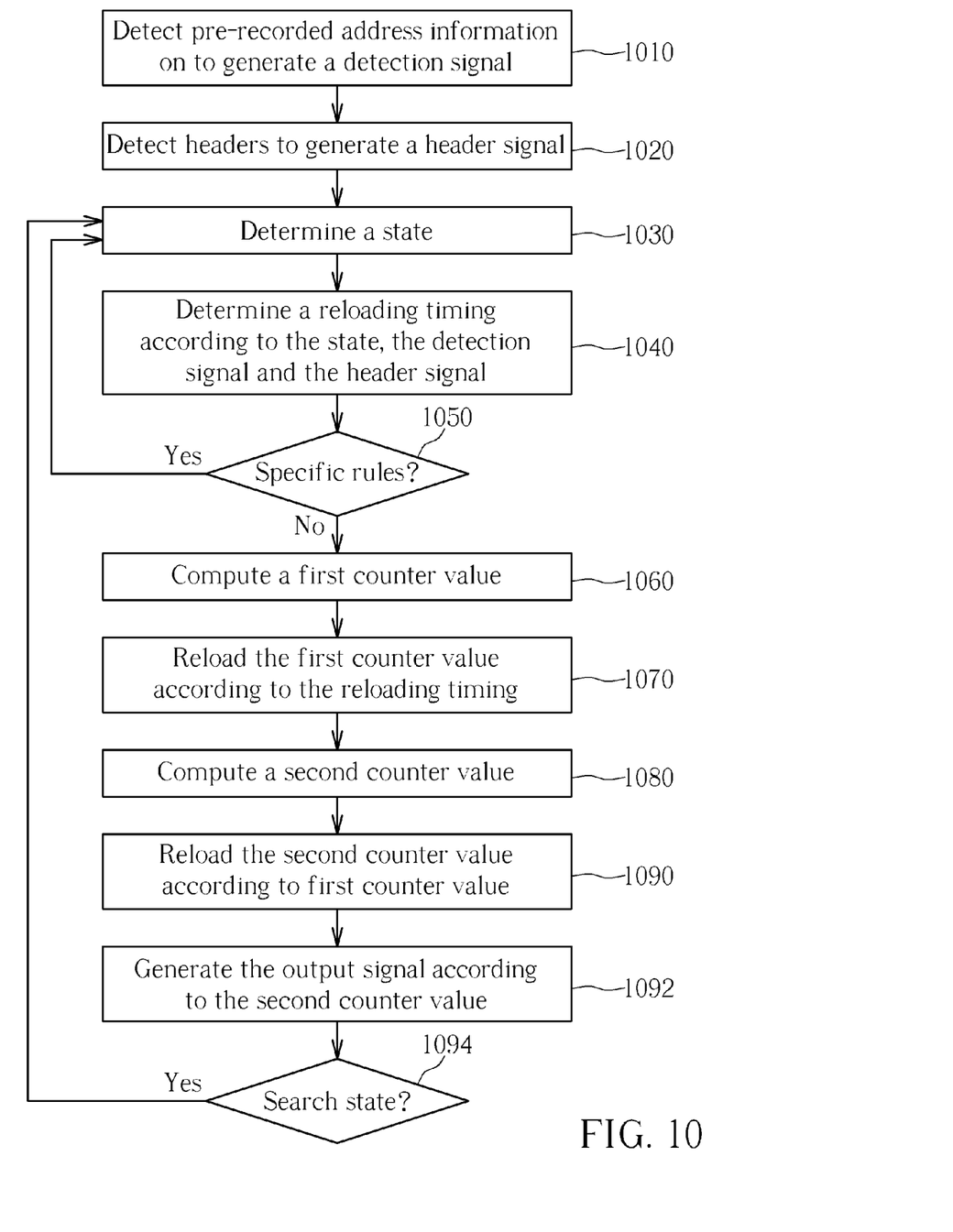
FIG. 10 is a flow chart illustrating the method for generating an output signal indicating a specific area on an optical disc according to the third embodiment of the present invention.

FIG. 10 is a flow chart illustrating the method for generating an output signal indicating a specific area on an optical disc according to the third embodiment of the present invention. The method is performed by the system 800 shown in FIG. 8, and summarized as follows.

Step 1010: Detect pre-recorded address information on an optical disc 802 to generate a detection signal P3.

Step 1020: Detect headers on the optical disc 802 to generate a header signal h3.

Step 1030: Determine a state.

Step 1040: Determine a reloading timing according to the state determined in step 1030, detection signal P3 and header signal h3.

Step 1050: Check if the special rules are met.

Step 1060: Compute a first counter value C4.

Step 1070: Reload the first counter value C4 according to the reloading timing determined in step 1040.

Step 1080: Compute a second counter value C5.

Step 1090: Reload the second counter value C5 according to the first counter value C4.

Step 1092: Generate an output signal O3 according to the second counter value C5.

Step 1094: Is the state SEARCH state? If yes, go to 1030.

Moreover, in a preferred example, step 1040 compares the first counter value C4 and a reloading value to which the first counter value C4 is reloaded and refers to the currently entered state to determine whether the reloading timing is valid. Step 1060 only reloads the first counter value C4 at a valid reloading timing.

In this case, since the special rules in step 1050 are similar to that of the method illustrated in FIG. 7, further description is omitted for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A system for generating an output signal indicating a specific area on an optical disc, comprising:
   a detecting circuit, for detecting pre-recorded address information on the optical disc to generate a detection signal;
   a header signal generator, for detecting headers on the optical disc to generate a header signal;
   a protection circuit, coupled to the detecting circuit and the header signal generator, for computing a first counter value, and reloading the first counter value according to the detection signal and the header signal, wherein the protection circuit does not reload the first counter value twice successfully due to the header signal;
   a counter, coupled to the protection circuit, for computing a second counter value and reloading the second counter value according to the first counter value; and
   an output signal generator, coupled to the counter, for generating the output signal according to the first counter value.

2. The system of claim 1, wherein the detection signal includes a plurality of first regions each indicating a specific pre-recorded address, the header signal includes a plurality of second regions each indicating a specific header, and the protection circuit reloads the first counter value according to the first and second regions.

3. The system of claim 1, wherein the counter reloads the second counter value each time the first counter value reaches a pre-determined value.

4. The system of claim 1, wherein the output signal generator generates the output signal when the second counter value reaches a pre-determined value.

5. The system of claim 1, wherein the output signal generator determines a plurality of regions indicating the specific area of the optical disc in the output signal according to the second counter value, and the counter does not reload the second counter value during each of the regions.

6. The system of claim 1, wherein the optical disc is a DVD-RAM, the pre-recorded address information is physical identification (PID), and the output signal is a field signal.

7. A method for generating an output signal indicating a specific area on an optical disc, comprising:
   (a) detecting pre-recorded address information on the optical disc to generate a detection signal;
   (b) detecting headers on the optical disc to generate a header signal;
   (c) computing a first counter value;
   (d) reloading the first counter value according to the detection signal and the header signal, wherein the first counter value is not successively reloaded twice due to the header signal;
   (e) computing a second counter value;
   (f) reloading the second counter value according to the first counter value; and
   (g) generating the output signal according to the first counter value.

8. The method of claim 7, wherein the detection signal includes a plurality of first regions each indicating a specific pre-recorded address, the header signal includes a plurality of second regions each indicating a specific header, and the step (d) reloads the first counter value according to the first and second regions.

9. The method of claim 7, wherein the step (f) reloads the second counter value each time the first counter value reaches a pre-determined value.

10. The method of claim 7, wherein the step (g) generates the output signal when the second counter value reaches a pre-determined value.

11. The method of claim 7, wherein the step (g) determines a plurality of regions indicating the specific area of the optical disc in the output signal according to the second counter value, and the step (g) does not reload the second counter value during each of the regions.

12. The method of claim 7, wherein the optical disc is a DVD-RAM, the pre-recorded address information is physical identification (PID), and the output signal is a field signal.

* * * * *